United States Patent
Lee

(10) Patent No.: US 6,698,419 B2
(45) Date of Patent: Mar. 2, 2004

(54) SMOKE EXTRACTING VENTILATION SYSTEM FOR COOKING

(75) Inventor: Mong-Yu Lee, No. 182, Chien-feng Road, Kang-shen, 820, Kaohsiung County (TW)

(73) Assignee: Mong-Yu Lee, Kaohsiung (TW)

( * ) Notice: Subject to any disclaimer, the term of this patent is extended or adjusted under 35 U.S.C. 154(b) by 178 days.

(21) Appl. No.: 09/964,310

(22) Filed: Sep. 26, 2001

(65) Prior Publication Data

US 2002/0056446 A1 May 16, 2002

(30) Foreign Application Priority Data

Sep. 26, 2000 (TW) .......................................... 089216586

(51) Int. Cl.[7] .............................................. F24C 15/20
(52) U.S. Cl. .................. 126/299 R; 126/299 D
(58) Field of Search ........................ 126/299 R, 299 D; 454/49, 55

(56) References Cited

U.S. PATENT DOCUMENTS

| | | | | |
|---|---|---|---|---|
| 3,957,591 A | * | 5/1976 | Riecker | 202/263 |
| 4,144,999 A | * | 3/1979 | Zebuhr | 126/570 |
| 4,900,341 A | * | 2/1990 | Csabai | 96/136 |
| 5,238,468 A | * | 8/1993 | Gabryszewski et al. | 95/267 |
| 5,910,209 A | | 6/1999 | Lee | |

* cited by examiner

*Primary Examiner*—Alfred Basichas

(57) ABSTRACT

This invention relates to one kind of ventilation system, with independent and modular components including a smoke extraction part, a joining component, a drying component, and a water tank that can be installed in a kitchen to constitute a smoke extractor. The system can be installed flexibly depending on the space and layout of the pre-existing kitchen, avoiding the waste of dismantling the original equipment and buying a whole set of smoke extractors. Therefore, with better industrial availability, this product can be installed in homes and restaurants.

18 Claims, 7 Drawing Sheets

SMOKE EXTRACTING VENTILATION SYSTEM FOR COOKING

BACKGROUND OF THE INVENTION

This invention is about an assembled ventilation system, a special practical device that consists of different, or modular, components; with each component having an independent function. The device can be installed flexibly depending on the variations of space, forming a smoke extracting ventilation system for cooking while improving the health of workers and reducing air pollution.

Although current devices with purifying smoke functions (such as the "Improved Smokeless Oven", disclosed in Republic of China Patent No. 347853, which was applied for by the present inventor and was approved) can attain a smokeless effect, the cooking smoke is still a health hazard to homeowners. Even though a smoke extractor is usually fixed above a gas stove, an ordinary smoke extractor only discharges harmful smoke outside and does not provide further treatment. Thus the problem of air pollution still exists.

Therefore, the inventor, in seeking perfection, has applied the designing principle of the smokeless oven mentioned in the above patent referenced to smoke extractors in kitchens and stoves to treat kitchen smoke and solve the problem of air pollution. Co-pending and commonly owned Republic of China patent application no. 89213828, entitled "Integral Smoke Extractor," includes an integral water tank, water pump, exhaust fan, and a water spraying device set inside the tank, matching the first and second layers of filter nets and water spray sprinkler heads with different heights. Water pumped by a water pump is sprayed from sprinkler heads, forming several layers of water screen to cool off the grease smoke which is inducted therein and then flushing into the water tank. Purified air is drained off to efficiently reduce the air pollution caused by cooking. Therefore, the device is very practical and has industrial value. However, that invention requires complete replacement of pre-existing equipment, and is therefore costly. In contrast, the present invention overcomes such limitations of the integral device. Rather this "assembled ventilation system" can be installed or retrofitted to the existing kitchen establishments without removing old configurations completely, thereby reducing cost. Therefore, it is suitable for the re-equipped structure of homes as well as restaurants.

The purpose of this invention is to provide an assembled ventilation system, including the smoking, joining and drying components, and the water tank, with each component having the potential of independent usage, i.e., the smoking component can be installed above the oven; the joining and drying components and the water tank can be installed inside the stove platform, or other locations. The bottom plate of the smoking component is connected to the opening(s) located on the top of the joining component. An opening on the top of the water tank faces the bottoms of the joining and drying components. The drying component has an opening where a pipe is set up. There is an extract fan at the end of the pipe. Water pipes, sprinkler heads/nozzles, and filter nets are located inside the smoking component. Water pipes go through the joining component into the water tank and out from the water entrance, connecting with the water pump, while the outlet of the water tank also connects to the pump through the water vent-pipe. Since each component works independently, the design is intended to give the system flexible usage depending upon the different environments. It is unnecessary to dismantle the original equipment, thus reducing cost. Therefore, this product is more practical, useful in homes as well as restaurants.

In order to further aid in the understanding of the structure, character and other purposes of this invention, drawings are attached to illustrate the invention in detail as follows.

DETAILED DESCRIPTION OF THE INVENTION

Figure 1:
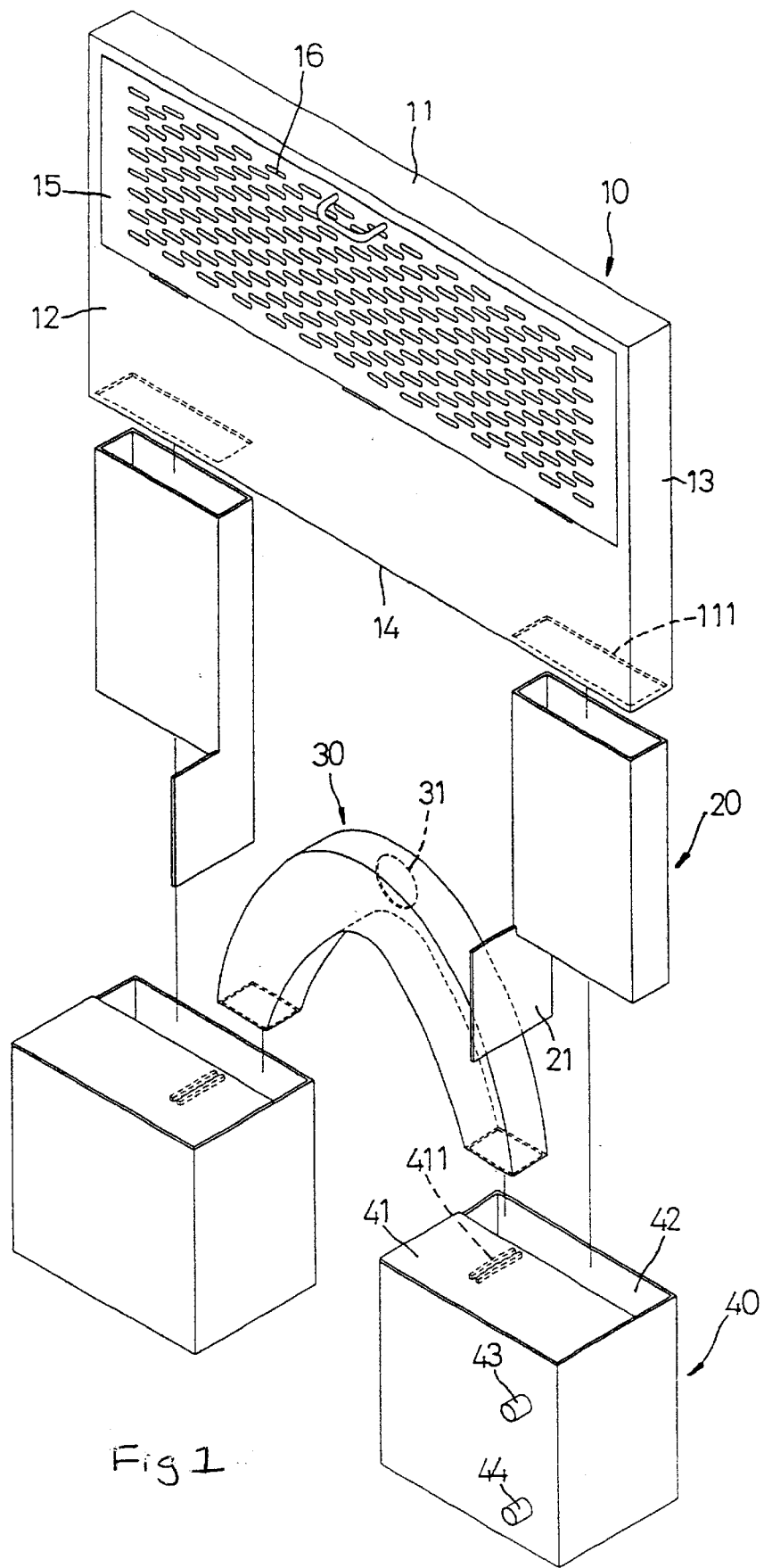
FIG. 1 disclosed a three-dimensional structure for a first embodiment.
Figure 2:
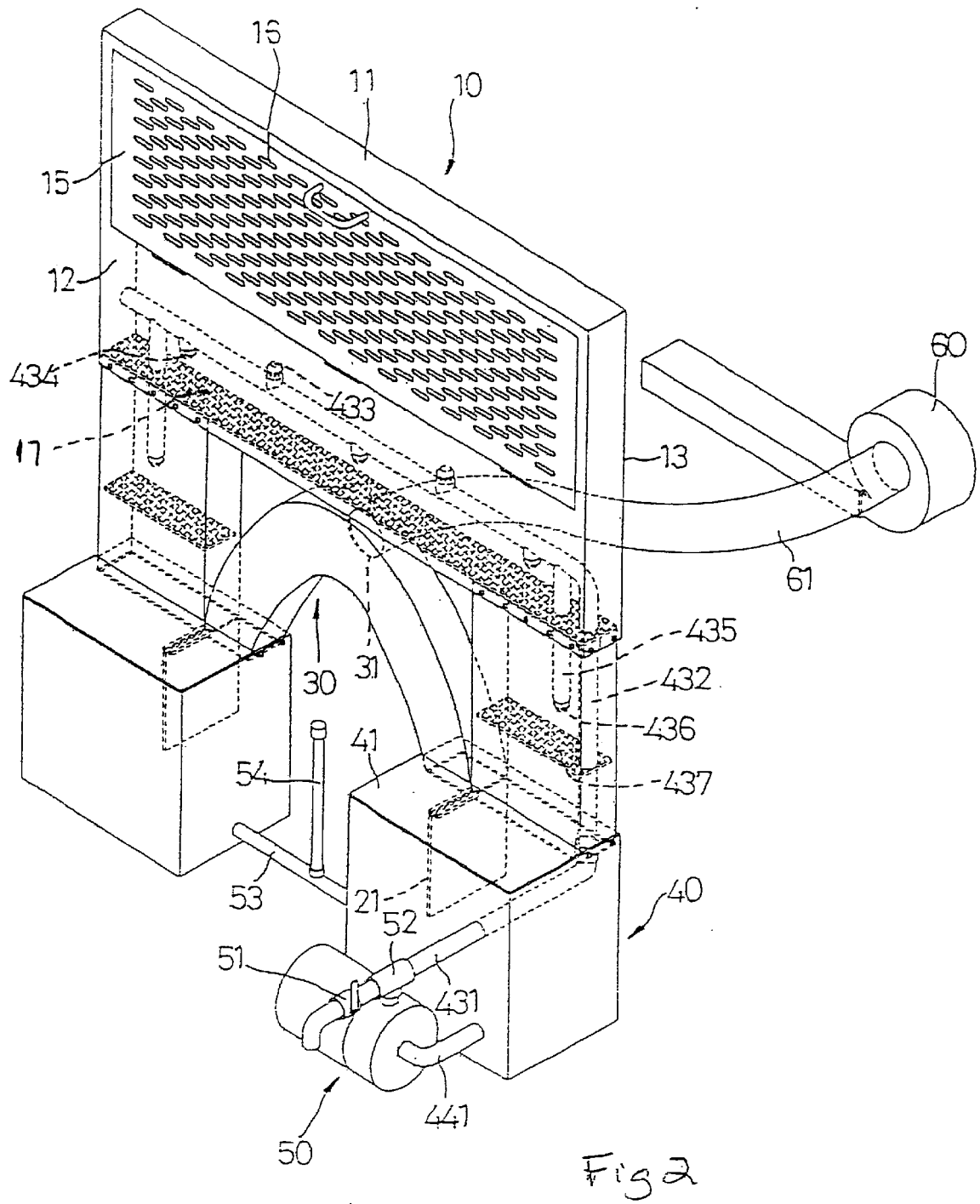
FIG. 2 discloses an assembly view of a first embodiment.

Referring to FIGS. 1 and 2, the first application of this invention includes the smoking (10), joining (20), drying (30) components, and water tank (40); with each of them being optionally structurally independent rather than integrally connected.

The smoking component (10) consists of vertical frame (11), front board (12), rear board (13), and bottom plate (14). A mobile plate (15) with holes (16) spread on it is set up on the front board (12), which can be opened outward. Openings (111) are located where the bottom plate (14) faces the joining component (20).

A side of the joining component (20) extends downward and forms an outstretched plate (21). The drying component (30) takes an arch shape, with an opening (31) set up on its top. The cover board (41) of the water tank (40) can be pulled open. While covering the water tank (40), the cover board (41) leaves an opening (42). A groove (411) is set up on the bottom of the covering board (41). The water inlet (43) is on one side or location of the water tank (40) with the outlet (44) on the other side or other location.

To combine the independent components, the top of the joining component (20) can be fixed to the openings (111) on the two sides of the bottom plate (14) of the smoking component (10). The outstretched plate (21) on the bottom of the joining component (20) can be inserted into the water tank (40), making the top plate cover the top of the water tank (40). The groove (411) clips the top end of the outstretched plate (21), and the outstretched plate (21) inserts into the openings (42) of the water tank (40). The two ends of the drying component (30) are implanted into the openings (42) of the two water tanks (40). It is recognized that other combining or joining means are possible, including ducting and the like.

Figure 3:
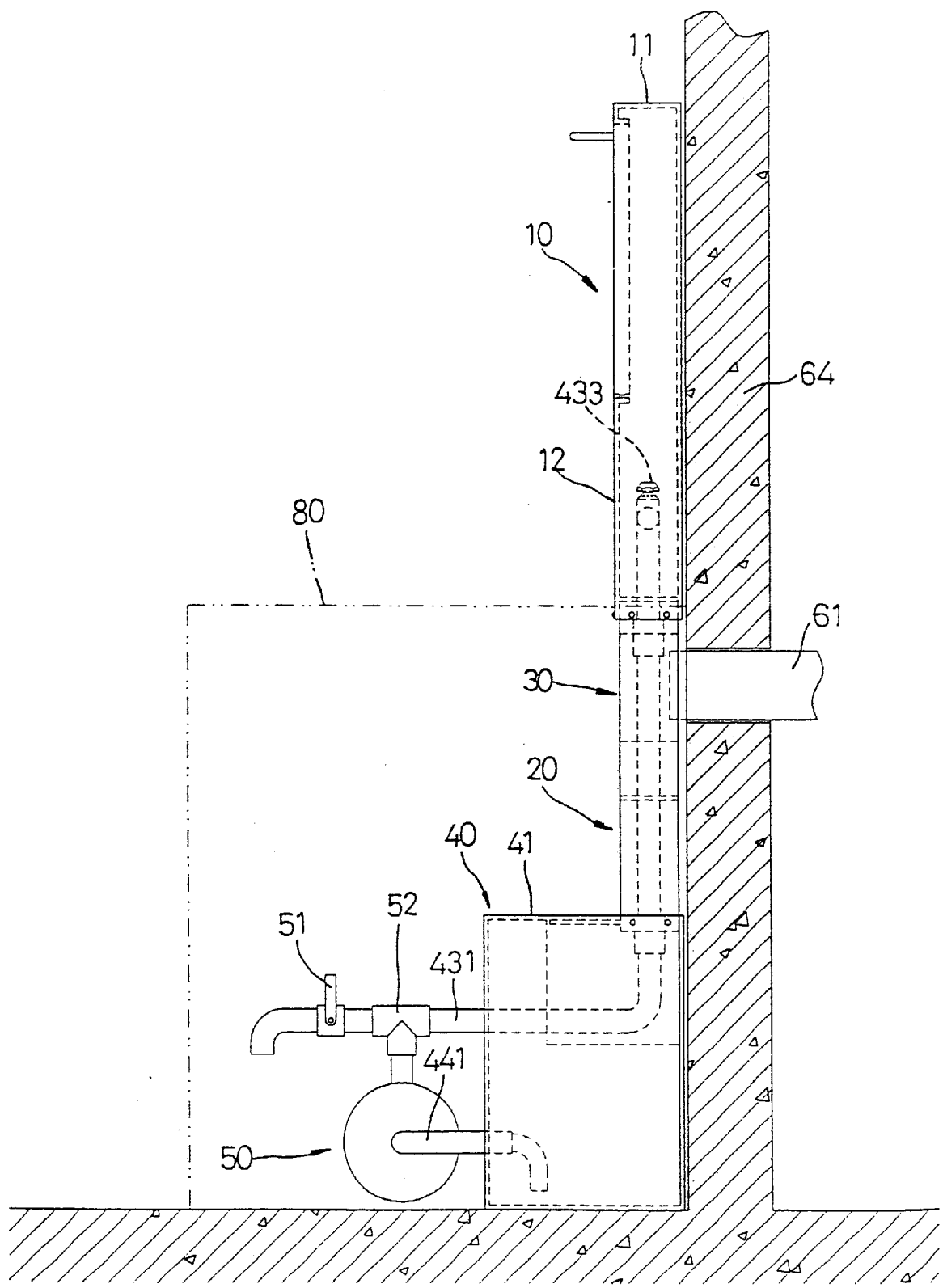
FIG. 3 discloses a stove platform installation for a first embodiment.

Referring to FIG. 2 and FIG. 3, while installing the oven board (i.e. cooking surface) (80), the invention makes the smoking component (10) sit on the rear side of the top of the oven board (80). The joining component (20), drying component (30), water tank (40) and water pump (50) are placed inside (i.e., within or beneath) the oven board (80). A hole is made where the rear topside of the oven board (80) faces the top of the joining component (20) linked with the bottom end of the smoking component (10). An opening (31) is set up on the rear side of the drying component (30) stored inside the oven board (80), which links outside of the oven board (80) through an exhaust pipe (61). Since this device may lean against the wall (64), a hole drilled on or through the wall (64) will lead the exhaust pipe (61) out. An exhaust fan (60) installed at the end of the exhaust pipe (61) exhausts the air, while the noise is completely channeled to the outside.

The water inlet (43) of the water tank (40) has a water pipe (431) directing water in and the outlet (44) has a water pipe (441) directing water out. The water pipe (431) directing water in connects to a three-way pipe (52) with a switch (51), and further extends into the water pump (50). The water pipe (441) directing water out also extends into the water pump (50). The water pipe (431) directing water inside the water tank (40) may be connected with the water pipe (432) of the joining component (20), which turns horizontal after entering the smoking component (10). On the top and bottom sides of this section of water pipe (432), several sprinkler heads (433), (434) may be set up. A filter net (17) is installed under the water pipe (432) inside the smoking component (10); another filter net (437) is installed inside the joining component (20). Another water pipe (435) is set up on the water pipe (432), with sprinkler heads set up on it, going through the joining component (20). Two water tanks (40) may be linked with a connecting tube (53) that has a water level tube (54) on it, by which the water level of the water tank (40) can be observed.

With this design, the independent components can be installed flexibly, depending upon the various shapes of the oven board (80) of pre-existing stoves. When the exhaust fan (60) starts, the grease smoke produced by cooking fried foods (or other items) on a gas (or other type of) stove on the oven board (80) will be drawn in through the holes (16) or the mobile plate (15) of the smoking component (10). The water in the water tank (40) drawn out through water pipe (441) goes through the water pipe (431) directing water in, spraying through the sprinkler heads (433), (434), (436) when the water pump (50) starts. Water from the sprinkler heads (433), (434) forms a layer of water screens so that the grease smoke drawn in is mixed up and cooled, flowing into the water tank (40). Purified smoke is directed outdoors through the joining component (20), water tank (40), drying component (30), and exhaust pipe (61). Since new components are designed to fit the existing stove platform, the cost of purchasing a whole new assembly is saved. Furthermore, the set of devices is more practical in kitchens of homes and restaurants since it can be assembled depending on the need of different environments.

Figure 4:
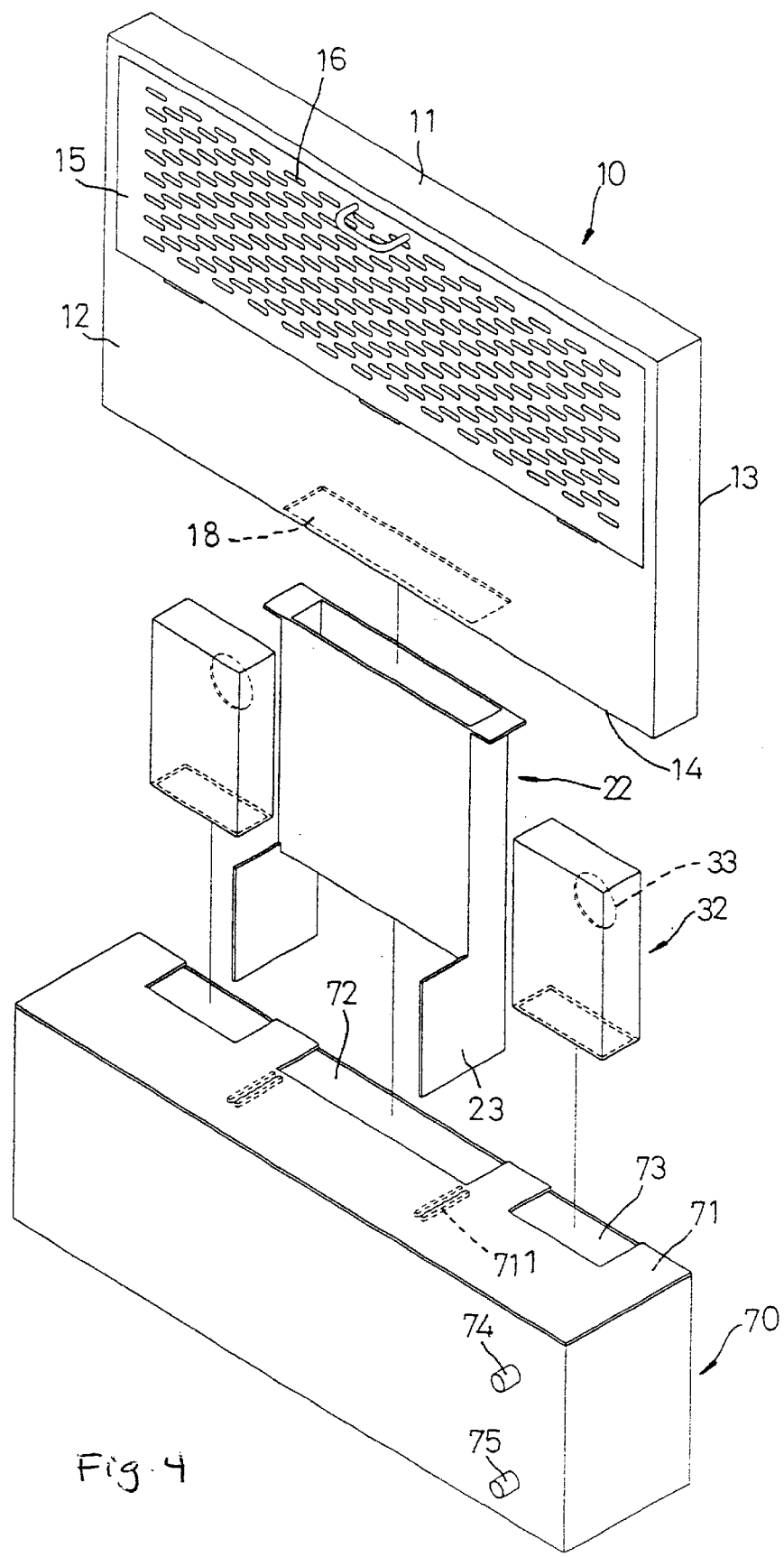
FIG. 4 discloses a three-dimensional structure for a second embodiment.
Figure 5:
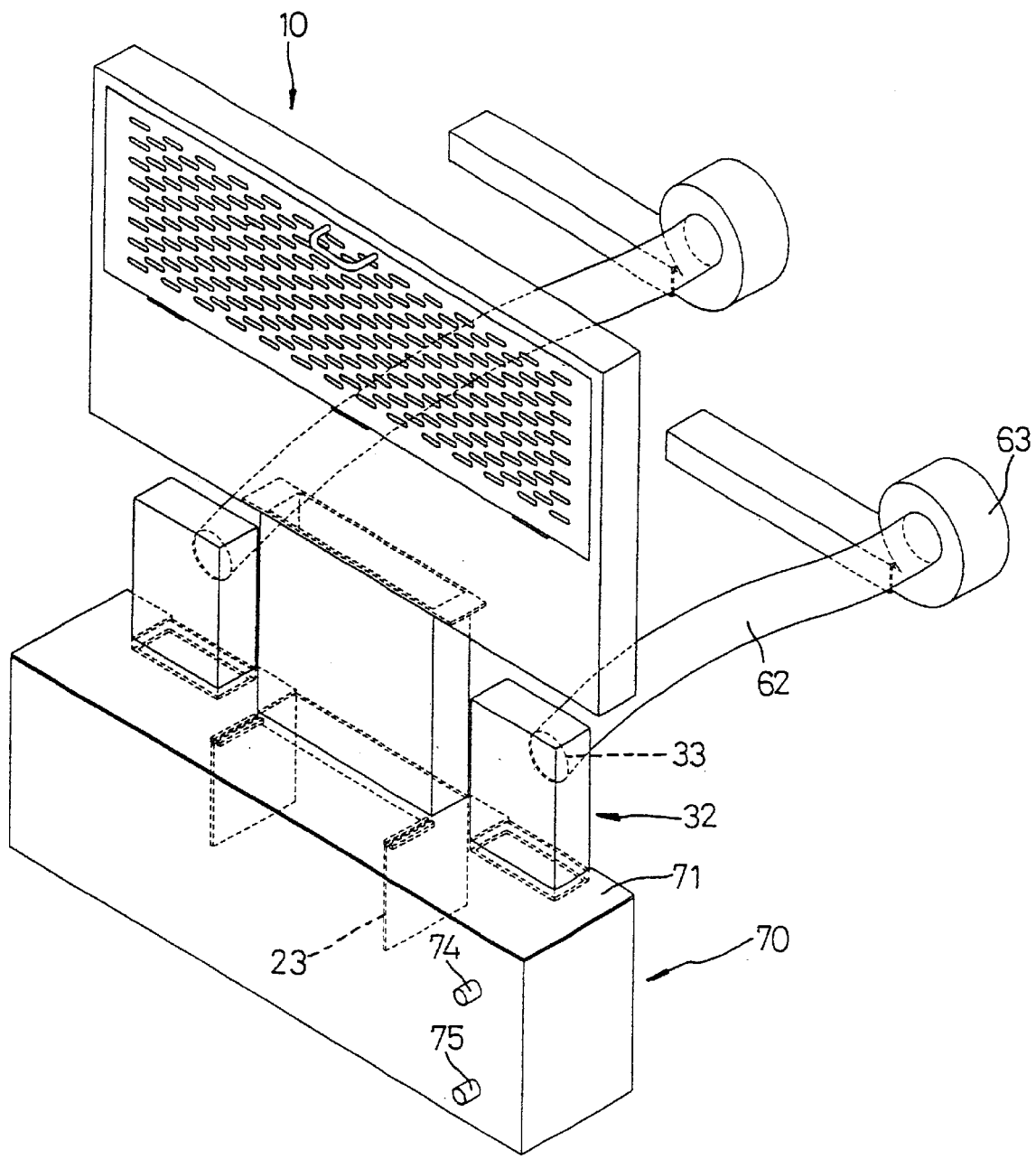
FIG. 5 discloses an assembly view for a second embodiment.

FIGS. 4 and 5 show the second application or embodiment of this product. It is similarly assembled with independent components, including the smoking (10), the joining (22) and the drying (32) components, and the water tank (70). The smoking component is arranged in the same way as in the first application. In addition, an opening (18) is made on the bottom plate (14). There are outstretched plates (23) at the bottom of both sides of the joining component. The drying component (32) forms the shape of a box, with three sides closed and one side open. Openings (33) are also set up in the front and rear of the drying component (32). The top plate (71) of the water tank (70) can be pulled open. There are also openings (72), (73) on it. A groove (711) is set up on the bottom of the top plate (71). The top of the joining component (22) may be fixed at the opening (18) located on the bottom plate (14) of the smoking component (10) and the bottom of joining component (22) goes into the water tank (70) that is covered by the top plate (71), while the groove (711) is clipped on the top of the outstretched plate (23). The bottom of the drying component (32) is set at the opening (73) of the water tank (70). An exhaust pipe links the opening (33) of the drying component (32) and an exhaust fan. The inlet (74) and outlet (75) of the water tank (70) may also be linked with water pumps through pipes. Related water pipes, sprinkler heads and filter nets may also be put in the smoking component (10). Just like the first application, the exhaust fan (63) draws grease smoke in through exhaust pipe (62) and makes it go into the joining component (22) through the smoking component (10). Water spray from the sprinkler heads forms several layers of water screens, mixing and cooling grease smoke that flows into the water tank (70). Finally, the purified grease smoke is directed outdoors by the joining component (22), water tank (70), drying component (32), opening (33) and exhaust pipe, achieving the same effect of cleaning the grease smoke as in the first application. Also as in the first application, the second application can make use of existing establishments to save the cost of the whole set of smoke-extractors. Thus, with this design, the components can be assembled flexibly without changing the original structure.

Figure 6:
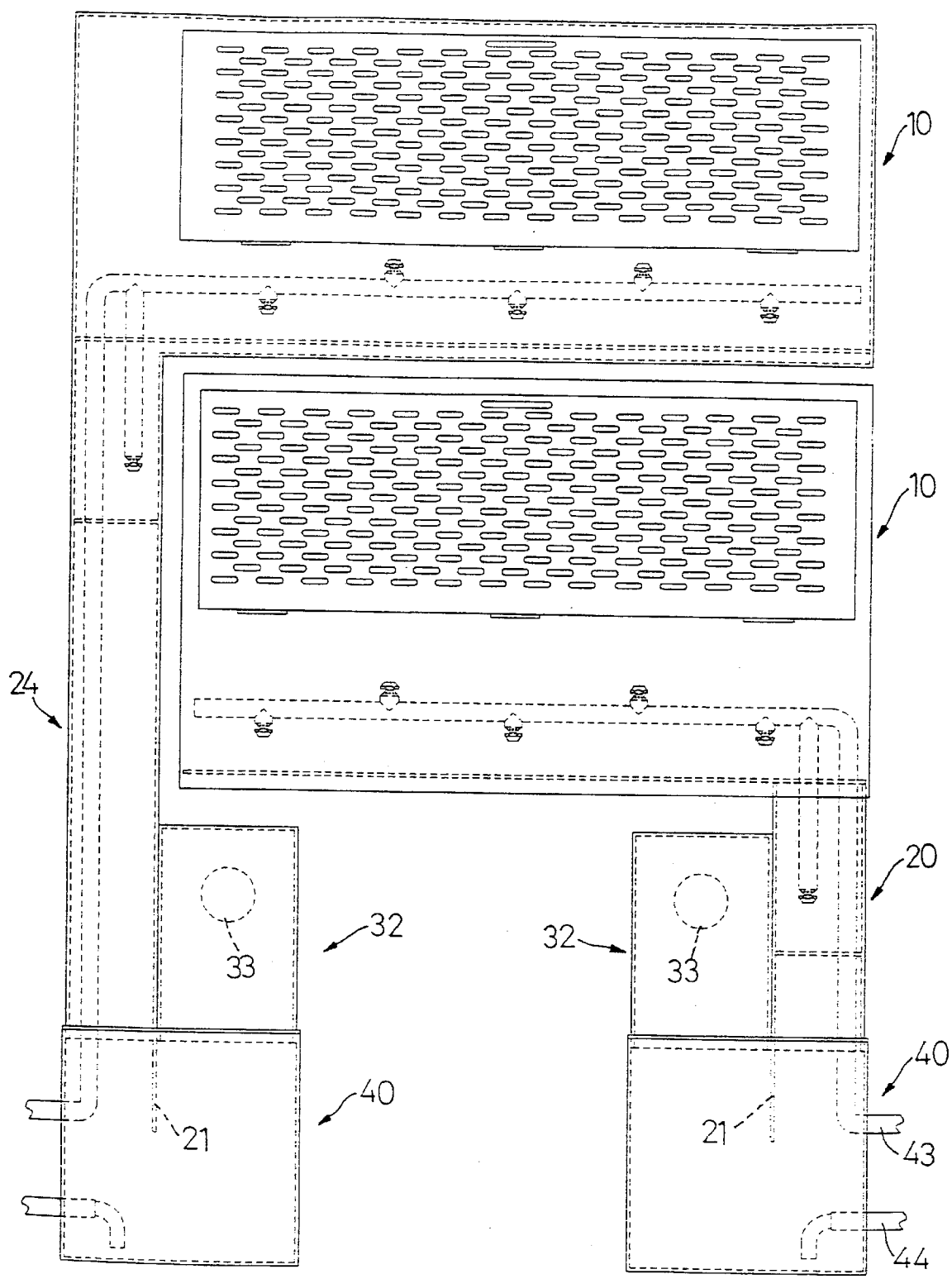
FIG. 6 discloses a front elevation view of the structure for a third embodiment.
Figure 7:
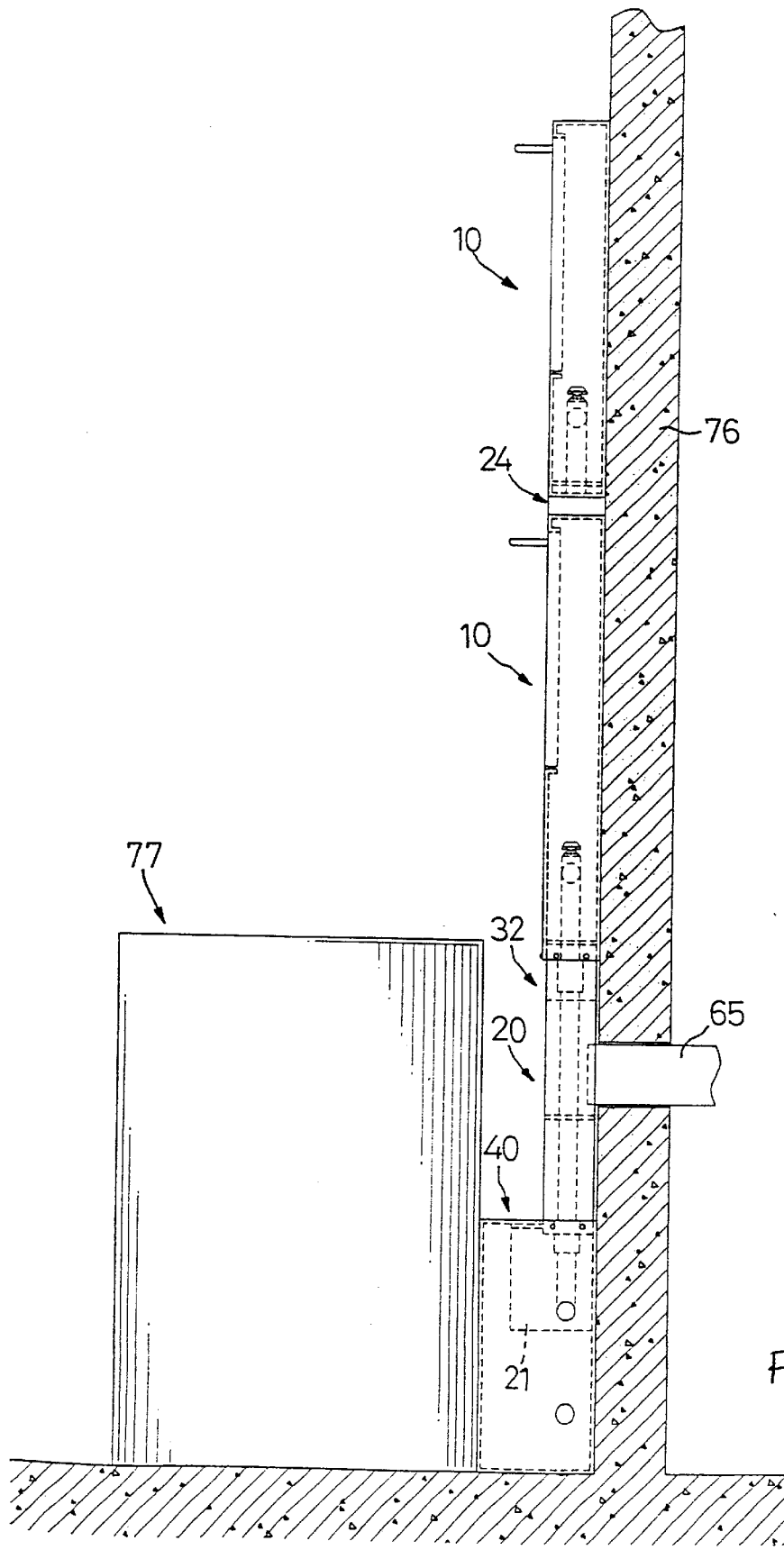
FIG. 7 discloses a side view of the structure for a third embodiment.

FIGS. 6 and 7 show the third application or embodiment. Two smoking components are overlapped to extend the scope of smoke drawn. The joining components (20), (24), water tank (40), and drying component (32) are fixed at the bottom of each of the two smoking components (10). The pipes and heads of the water pipe are fixed inside the smoking component (10). The outstretched plate (21) located at the bottom of the joining components (20), (24) goes into the water tank (40). The water pipe directing water in (43) and the water pipe directing water out (44) are connected to the water pump, which is installed outdoors. The whole assembly can lean against the wall (76). The exhaust pipe (65) located at the rear side of the drying component (32) goes out through the wall (76), with the exhaust fan at the end of the exhaust pipe (65) leading outside. For the three applications mentioned above, the water pipes can be assembled outside the device so as to be visible. It can also attain the effect that water sprays from the sprinkler heads. The whole assembly can be set up quickly in different environments. For example, a frying stove (77) used by a fast-food restaurant may be put in the front of this product, which will inhale the grease smoke and discharge fresh air.

In addition, the smoking component, joining component, drying component, and water tank of the invention constitute one device as described above. However, the number and location configuration of components to be assembled and combined may be determined flexibly depending on the space available at the site. Also, with simple valve-lineups, it is possible to provide a self-cleaning mode of operation by which the cleaning fluid may be mixed with the water and the entire piping and filter net system may be cleaned, rinsed, drained, and restocked. Automatic operation and mode control is readily achievable by known technology of electronic control systems.

In summary, it is recognized that this invention provides teachings for optimized smoke removal. These teachings allow improved air quality for those cooking as well as those affected by the exhaust smoke, i.e., the community at large. The invention includes methods and apparatus for achieving these goals.

What is claimed is:

1. A modular ventilation system comprising:
   a. a smoking component having a plurality of nozzles and at least one filter net, wherein the nozzles provide water to contact a gas stream;
   b. a water tank;
   c. a joining component useful for connecting the smoking component to the water tank and having at least one filter net, wherein the smoking component is in gas and liquid communication with the joining component;
   d. a drying component in gas flow communication with the water tank; and
   e. exhausting means useful for exhausting a purified gas stream, wherein the exhausting means is located a suitable distance from the smoking component to significantly reduce noise associated with the exhausting means;
   f. wherein the modular ventilation system is suitable for installation and use with an existing cooking surface.

2. The modular ventilation system of claim 1, wherein the exhausting means is at least one fan.

3. The modular ventilation system of claim 1, wherein the side of the joining component extends downwards and forms an outstretched plate useful for separating contaminated gas from purified gas.

4. The modular ventilation system of claim 1, wherein the exhaust means is located outdoors.

5. The modular ventilation system of claim 1, wherein the exhaust means is located under the existing cooking surface.

6. The modular ventilation system of claim 1, further including a water pump useful for transporting water from the water tank to the plurality of nozzles.

7. The modular ventilation system of claim 1, wherein the drying component is substantially U-shaped.

8. The modular ventilation system of claim 7, wherein the purified gas stream flows through the drying component in a substantially U-shaped fashion.

9. The modular ventilation system of claim 1, wherein the drying component is substantially rectangular shaped.

10. The modular ventilation system of claim 1, wherein the existing cooking surface is located in a commercial facility.

11. The modular ventilation system of claim 1, wherein the existing cooking surface is located in a residential facility.

12. The modular ventilation system of claim 1, wherein there are two overlapped smoking components.

13. The modular ventilation system of claim 1, wherein the water from the nozzles and the filter nets produce a plurality of water screens useful for condensing gasses.

14. The modular ventilation system of claim 1, wherein cleaning fluid is mixed with the water.

15. The modular ventilation system of claim 1, wherein there are two water tanks.

16. The modular ventilation system of claim 15, wherein the two water tanks are in liquid communication with each other.

17. A method for modifying an existing cooking surface comprising:
   a. providing a modular ventilation system comprising a smoking component having at least one filter net and a plurality of nozzles, a water tank, a joining component having at least one filter net, wherein the joining component is in gas and liquid communication with the smoking component and the water tank, a drying component, a water pump, and an exhaust fan in gas flow communication with the drying component; and
   b. installing the modular ventilation system proximate an existing cooking surface.

18. A method for purifying gases contaminated on a cooking surface comprising:
   a. preparing food on a cooking surface in a manner that produces gases;
   b. utilizing a modular ventilation system comprising a smoking component having at least one filter net and a plurality of nozzles, a water tank, a joining component having at least one filter net, wherein the joining component is in gas and liquid communication with the smoking component and the water tank, a drying component, a water pump, and an exhaust fan in gas flow communication with the drying component to purify the gases;
   c. intaking the gases produced by preparing food into the modular ventilation system; and
   d. exhausting purified gas.

* * * * *